US005132554A

United States Patent [19]
Hiramatsu et al.

[11] Patent Number: 5,132,554
[45] Date of Patent: Jul. 21, 1992

[54] CLOCK GENERATING APPARATUS

[75] Inventors: Yonejirou Hiramatsu, Mitaka; Shun-ichi Satou, Kashiwa, both of Japan

[73] Assignee: Sharp Kabushiki Kaisha, Osaka, Japan

[21] Appl. No.: 613,696

[22] PCT Filed: Mar. 28, 1990

[86] PCT No.: PCT/JP90/00429
 § 371 Date: Nov. 29, 1990
 § 102(e) Date: Nov. 29, 1990

[87] PCT Pub. No.: WO90/11662
 PCT Pub. Date: Oct. 4, 1990

[30] Foreign Application Priority Data

| Mar. 29, 1989 | [JP] | Japan | 1-77171 |
| May 26, 1989 | [JP] | Japan | 1-134158 |
| Jul. 29, 1989 | [JP] | Japan | 1-197774 |
| Jul. 29, 1989 | [JP] | Japan | 1-197776 |

[51] Int. Cl.$^5$ .................. H03K 7/00; H03K 17/00
[52] U.S. Cl. .................. 307/269; 328/63; 328/72; 328/155
[58] Field of Search .......... 328/63, 72, 155, 156, 328/158; 307/480, 269; 375/110, 111, 119

[56] References Cited

U.S. PATENT DOCUMENTS

| 4,653,075 | 3/1987 | Wisniewski | 375/110 |
| 4,780,891 | 10/1988 | Guerin et al. | 375/111 |
| 4,799,240 | 1/1989 | Yoshida | 375/119 |
| 4,891,598 | 1/1990 | Yoshida et al. | 328/63 |

FOREIGN PATENT DOCUMENTS

| 61-33308 | 8/1986 | Japan . |
| 62-188483 | 8/1987 | Japan . |
| 64-39888 | 2/1989 | Japan . |
| 1-261089 | 10/1989 | Japan . |

*Primary Examiner*—Timothy P. Callahan

[57] ABSTRACT

A clock generating apparatus includes a crystal oscillator wherein a clock signal generated from the crystal oscillator passes through a band pass filter to become a reference clock signal of a sine wave. This clock signal is applied to a first multiplier and is delayed ¼ cycle by a ¼ cycle delayer to become a clock signal $\cos 2\pi f_{ct}$. The delayed signal is applied to a second multiplier. When an external horizontal synchronizing signal is externally applied, an A/D converter samples the horizontal synchronizing signal in response to a reference clock signal to apply a digital signal to an operating device. The operating device operates a phase difference between an absolute phase of the digital signal and a predetermined phase to output a sine wave component $\sin(a-b)$ and a cosine wave component $\cos(a-b)$ corresponding to the phase difference. The first multiplier multiplies the clock signal $\sin 2\pi f_{ct}$ as a reference by the sine wave component $\sin(a-b)$. The second multiplier multiplies the cosine clock signal $\cos 2\pi f_{ct}$ by the cosine wave component $\cos(a-b)$. The multiplication results are added by an adder, which addition is binarized by a comparator to be outputted as an output clock pulse W·CK.

13 Claims, 13 Drawing Sheets

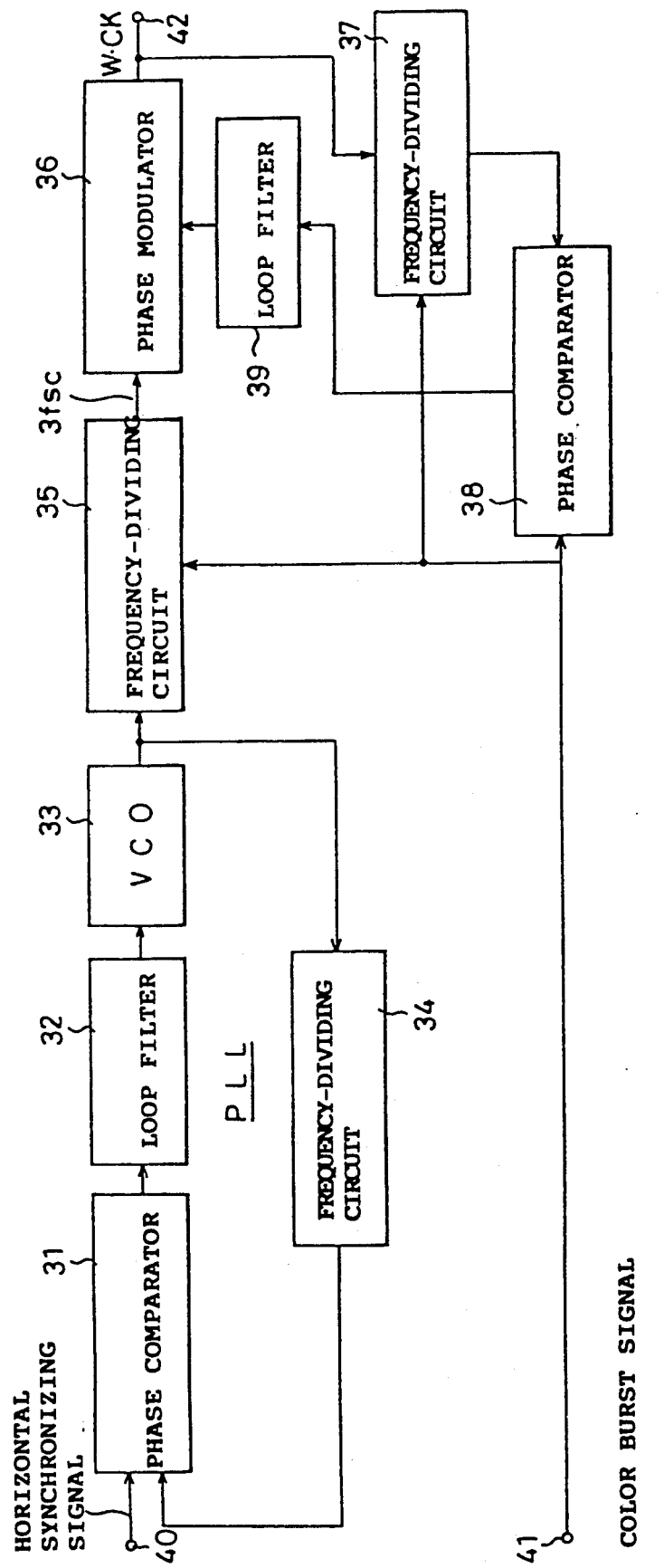

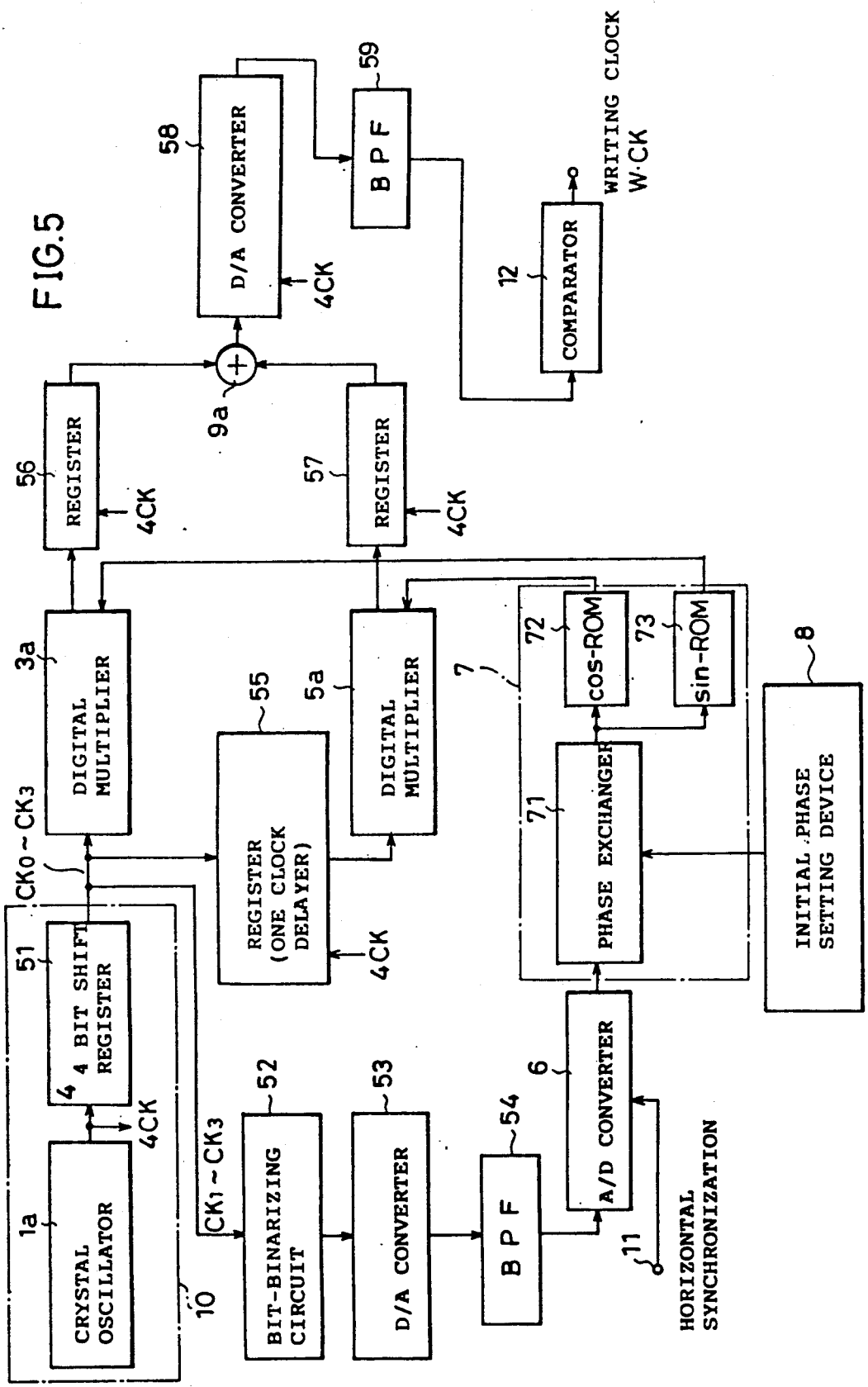

| STATE | INPUT | | | OUTPUT | |
|---|---|---|---|---|---|
| | CK₁ | CK₂ | CK₃ | MSB | LSB |
| 0 | H | H | H | L | L |
| 1 | L | H | H | L | H |
| 0 | H | L | H | H | L |
| -1 | H | H | L | H | H |

FIG.12A

| STATE | INPUT | | | | OUTPUT |
|---|---|---|---|---|---|
| | Dn | CK0 | CK2 | CK3 | Dn' |
| 0 | L | L | H | H | L |
| 1 | L | H | H | H | L |
| 0 | L | H | L | H | L |
| -1 | L | H | H | L | H |
| 0 | H | L | H | H | L |
| 1 | H | H | H | H | H |
| 0 | H | H | L | H | L |
| -1 | H | H | H | L | L |

| STATE | INPUT | | | | OUTPUT |
|---|---|---|---|---|---|
| | D9 | CK0 | CK2 | $\overline{CK1}$ | D9' |
| 0 | L | L | H | L | H |
| 1 | L | H | H | H | L |
| 0 | L | H | L | L | H |
| -1 | L | H | H | L | H |
| 0 | H | L | H | L | H |
| 1 | H | H | H | H | H |
| 0 | H | H | L | L | H |
| -1 | H | H | H | L | L |

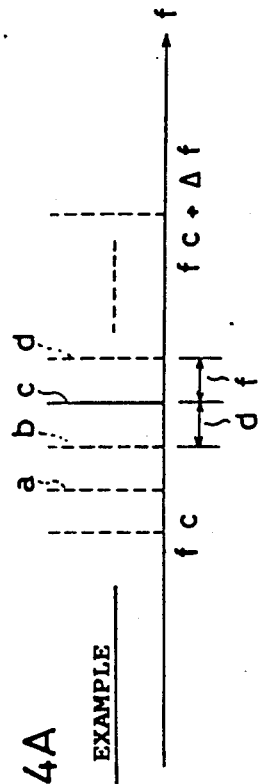
FIG.14A
A:sin(2πfct+C) EXAMPLE
FIG.14B
B:sin(2πfct−C) EXAMPLE
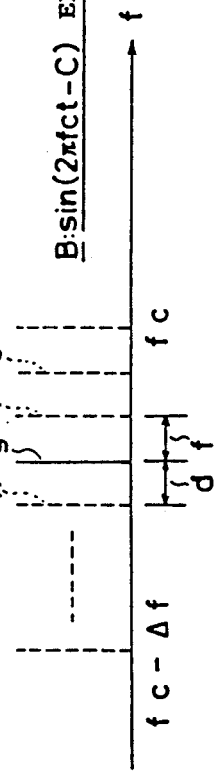
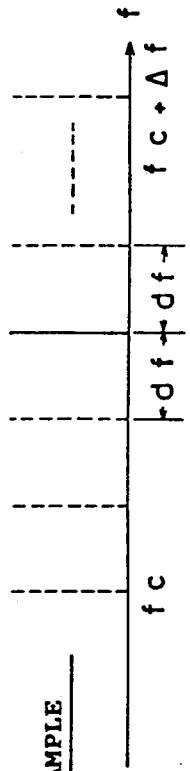
FIG.15A
A:sin(2πfct+C) EXAMPLE
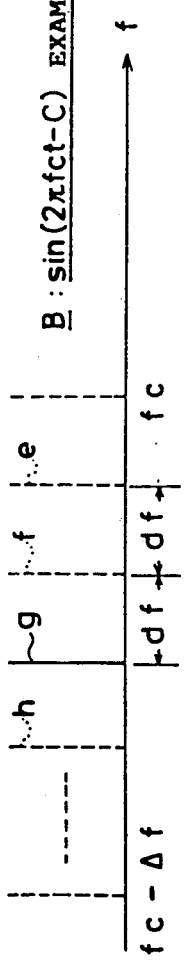
FIG.15B
B:sin(2πfct−C) EXAMPLE

CLOCK GENERATING APPARATUS

TECHNICAL FIELD

The present invention relates generally to clock generating apparatii. More specifically, the present invention relates to a clock signal generating apparatus for application in a writing clock generating circuit of a time base corrector or the like for generating a clock signal by synchronizing an externally applied horizontal synchronizing signal with a reference synchronizing signal.

BACKGROUND ART

In recording a video signal on an optical disc or in a video tape recorder in the form of an analog signal and reproducing the same, a time base corrector is used for removing time base fluctuation of the reproduced video signal.

FIG. 1 is a schematic block diagram showing one example of a conventional time base corrector. Referring to FIG. 1, a terminal 26 receives a reproduced video signal (still picture signal) having a time base fluctuated. This reproduced video signal is applied to an A/D convertor 21 and a writing clock generating circuit 24. Writing clock generating circuit 24 separates a horizontal synchronizing signal from the reproduced video signal and also generates a writing clock signal W·CK corresponding to a time base fluctuation of the reproduced video signal. In response to the writing clock signal W·CK, A/D converter 21 samples the reproduced video signal and digitalizes the same to be applied to a memory 22. Memory 22 writes the digitalized video signal in response to the writing clock signal W·CK having the same time base fluctuation.

Meanwhile, an external reference synchronizing signal is applied to a reading clock generating circuit 25, which circuit generates a reading clock signal R·CK synchronized with the external reference synchronizing signal having a fixed time base, which clock signal is applied to memory 22 and a D/A converter 23. In response to the reading clock signal R·CK, memory 22 reads the stored digital video signal and applies the same to D/A converter 23. In response to this reading clock signal R·CK, D/A converter 23 converts the digital video signal to an analog signal. Therefore, the video signal output from D/A converter 23 to an output terminal 27 has a fixed time base.

Time base correcting capability of such a time base corrector as shown in FIG. 1 depends on whether the writing clock signal W·CK can be generated or not which precisely corresponds to a time base fluctuation of the reproduced video signal. A conventionally proposed common BCO (burst controlled oscillator) using such elements as a crystal oscillator, a coil and a capacitor is not satisfactory and therefore a circuit is required having a wide frequency response range and a high response speed. Such a BCO is essentially liable to become unstable, affected by noise, waveform distortion, drop out or skew.

Thus, various improvements have been made in a burst gate circuit or a synchronization separating circuit included in a time base corrector in order to prevent attenuation of a time base fluctuation component of an input video signal while reducing the effect of noise or the like. For example, used as a horizontal synchronizing signal separating circuit are a delay circuit, a synchronization gate circuit employing a gate signal and a flywheel oscillator, and such a circuit as detecting drop out to mute the drop out noise in a video signal and inhibiting synchronization separating or clamping. A wide-band circuit is used as a color burst gate circuit for amplifying and separating a synchronizing signal and a color burst signal.

FIG. 2 shows one example of a case where a precise reading clock signal R·CK is generated by using the separated synchronizing signal and color burst signal.

In a writing clock generating circuit 24 shown in FIG. 2, a horizontal synchronizing signal is applied to a phase comparator 31 through a terminal 40. Phase comparator 31 compares the phase of the horizontal synchronizing signal with that of a signal obtained by frequency-dividing an output of a variable voltage controlled oscillator (VCO) 33. A frequency-dividing circuit 34 applies an error voltage to VCO 33 through a loop filter 32. Phase comparator 31, loop filter 32, VCO 33 and frequency-dividing circuit 34 constitute a PLL loop. Loop filter 32 is provided in order to prevent oscillation of the PLL loop, by which loop filter 32, even at a sudden phase fluctuation of the video signal, the output of VCO 33 scarcely follows the phase fluctuation, resulting in a phase being independent of a sub carrier.

The output of VCO 33 is applied to a frequency-dividing circuit 35 wherein the frequency of the output is divided by four to output a $3f_{SC}$ ($f_{SC}$ is a sub carrier frequency) signal. Frequency-dividing circuit 35 is reset in response to one pulse of a color burst signal inputted to a terminal 41. Through the resetting operation, a phase difference between the $3f_{SC}$ signal, the frequency-divided output of frequency-dividing circuit 35, and the color burst signal becomes 30° or less in color sub carrier phase. When using the ¼ frequency-divided output of frequency-dividing circuit 35 is applied to a phase modulator 36 wherein the phase of the output is modulated, which modulated output is applied to a frequency-dividing circuit 37 wherein the frequency thereof is divided by 3 to attain the same cycle of the color sub carrier. The ⅓ frequency-divided output of frequency-dividing circuit 37 is applied to a phase comparator 38. Phase comparator 38, with the color burst signal applied thereto, compares phases of the ⅓ frequency-divided output signal and the color burst signal to apply an error voltage to phase modulator 36 through a loop filter 39. In response to the error voltage, phase modulator 36 modulates the phase of the $3f_{SC}$ signal to output to a terminal 42 a writing clock signal W·CK following the input video signal and having a phase locked to the horizontal synchronizing signal.

Since in time base corrector 20 using writing clock generating circuit 24 shown in FIG. 2, however, feed back control is employed wherein loop filters 32 and 39 are used in VCO 33 for generating a signal from which a writing clock signal is generated and in phase modulating circuit 36 for phase-locking the output of frequency-dividing circuit 35 to a color burst signal, respectively, even such improvements as described above do not allow a writing clock generating circuit having an high response speed to be achieved. In the case of an optical disc still picture file, in particular, it is impossible to completely correcting a time base at a high speed through feed back control because one frame of still picture is reproduced only for a short time period and a rotation jitter of the optical disc has a high frequency component.

DISCLOSURE OF THE PRESENT INVENTION

Therefore, a principal object of the present invention is to provide a clock generating apparatus synchronized with an input signal and having an improved response speed.

Another object of the present invention is to provide a clock generating apparatus capable of generating a stable clock signal synchronized with a reference signal and having a fixed frequency.

The present invention relates to a clock generating apparatus generating an output clock signal by synchronizing a phase of an input signal with a phase of a reference clock signal, wherein a second clock signal generating circuit generates a second clock signal having a phase orthogonal to a phase of a first clock signal in response to a first clock signal generated from a first clock signal generating circuit. The first clock signal is a reference clock signal. A phase difference between the input signal and the first clock signal is detected by a phase difference detecting circuit to output first and second detecting signals each having a phase difference and the signals having phases orthogonal to each other. In response to the first and the second clock signals and the first and the second detecting signals, an output clock signal generating circuit generates an output clock signal synchronized with the phase of the input signal.

Therefore, the present invention allows a reference clock signal such as a stable writing clock signal to be generated which synchronizes an input signal with a phase of a reference signal at a high speed in a wideband and having a sufficiently wide frequency response range and a high response speed. Thus, the present invention can be effectively applied to a writing clock generating circuit of a time base corrector for such as an optical disc still picture file having a high rotation jitter.

According to a preferred embodiment of the present invention, a phase difference detecting circuit includes a sampling circuit for sampling an input signal in response to a first clock signal, an operating circuit for operating a phase difference between an absolute phase of the sampled input signal and a predetermined phase, and a storage circuit for storing previously sine wave data and cosine wave data to output a sine wave signal having the phase difference operated by the operating circuit as a first detecting signal and output a cosine wave signal having the phase difference as a second detecting signal.

According to a more preferred embodiment of the present invention, an output clock signal generating circuit includes a first multiplying circuit for multiplying a first clock signal by a first detecting signal, a second multiplying circuit for multiplying a second clock signal by a second detecting signal, and an adding circuit for adding the respective outputs of the first and second multiplying circuits to output an output clock signal.

In accordance with another aspect of the present invention, the present invention is directed to a clock generating apparatus for generating a clock signal having an arbitrary frequency in a predetermined range of frequency with respect to a reference clock signal, wherein a first clock signal generating circuit generates a first clock signal as a reference clock signal and in response to the first clock signal, a second clock signal generating circuit generates a second clock signal having a phase orthogonal to that of the first clock signal. A setting signal for setting a frequency is inputted to an input terminal and the input setting signal is integrated by an integration circuit in response to the first clock signal. When the integrated setting signal is inputted to a storage circuit, sine wave data and cosine wave data having amplitude values corresponding to the integrated setting signal is read. In response to the first clock signal, the second clock signal, the sine wave data and the cosine wave data, an output clock signal generating circuit generates an output clock signal having a phase synchronized with that of the reference clock signal and a set frequency.

Therefore, in accordance with a further aspect of the present invention, a clock signal having an arbitrary frequency can be obtained in response to a setting signal. Therefore, it is possible to easily obtain a clock signal having a frequency very close to that of a reference signal, whereby a clock signal can be easily obtained having a higher frequency than that of the reference signal.

According to a more preferred embodiment of the present invention, an output clock signal generating circuit includes a first multiplying circuit for multiplying a first clock signal by cosine wave data read from a storage circuit, a second multiplying circuit for multiplying a second clock signal by sine wave data, and an adding circuit for adding the respective outputs of the first and the second multiplying circuits.

In accordance with a more preferred embodiment of the present invention, a storage circuit stores separately more significant bits and less significant bits of sine wave data and cosine wave data. An amplitude of a first clock signal is attenuated to a predetermined level by a first attenuating circuit, and an amplitude of a second clock signal is attenuated to a predetermined level by a second attenuating circuit. A first multiplying circuit is constituted by a third multiplying circuit for multiplying the first clock signal by the more significant bits of the cosine wave data and a fourth multiplying circuit for multiplying the first clock signal which amplitude is attenuated to a predetermined level by the less significant bits of the cosine wave data. A second multiplying circuit is constituted by a fifth multiplying circuit for multiplying a second clock signal by the more significant bits of the sine wave data and a sixth multiplying circuit for multiplying the second clock signal attenuated to a predetermined level by the less significant bits of the sine wave data.

BRIEF DESCRIPTION OF THE DRAWINGS

FIG. 2 is a block diagram of a writing clock generating circuit for use in the time base corrector shown in FIG. 1.

FIG. 5 is a block diagram showing another embodiment of the present invention.

FIGS. 12A and 12B are tables showing truth values of the digital multiplier shown in FIG. 11.

FIGS. 14A, 14B, 15A and 15B are frequency spectrum of clock signals generated by the clock generating apparatus shown in FIG. 13.

BEST MODE FOR IMPLEMENTING THE INVENTION

Figure 3:
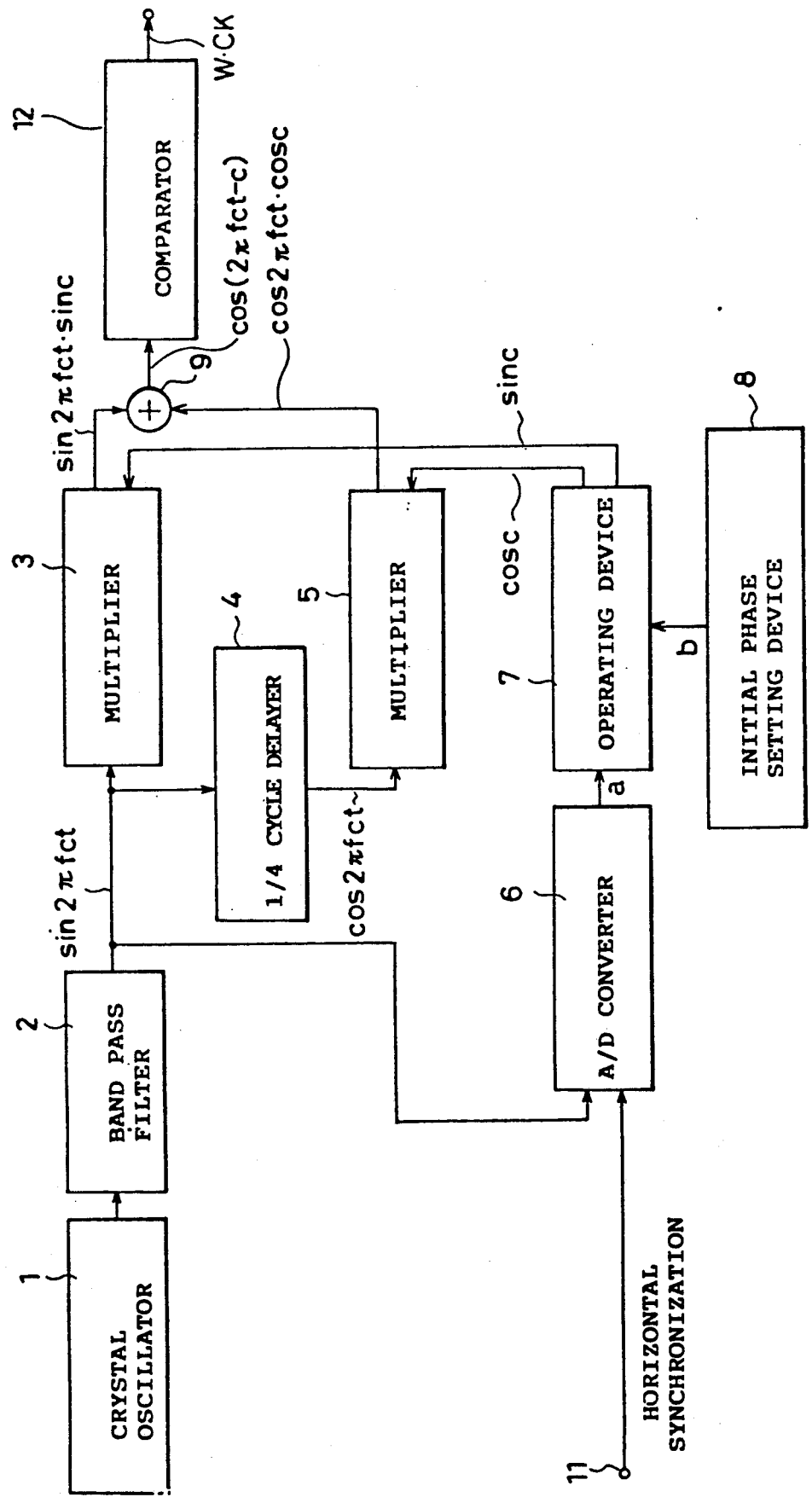
FIG. 3 is a block diagram showing one embodiment of the present invention.

FIG. 3 is the block diagram showing one embodiment of the present invention. The arrangement will be described with reference to FIG. 3. A crystal oscillator 1 generates a clock signal of rectangular waveform having a frequency of 4.05 MHz ($=f_c$), for example. The reference clock signal is applied to a band pass filter 2. Band pass filter 2 converts the reference signal of rectangular waveform to a sine wave signal $\sin(2\pi f_{ct})$ of 4.05 MHz. $\pi$ denotes a ratio of the circumference of a circle to its diameter and t denotes a time. The sine wave signal $\sin(2\pi f_{ct})$ is applied to a first multiplier 3, a ¼ cycle delayer 4 and an A/D converter 6. ¼ cycle delayer 4 delays the inputted sine wave signal $\sin(2\pi f_{ct})$ by ¼ cycle to output a cosine wave signal $\cos(2\pi f_{ct})$ as a second clock signal. The cosine wave signal $\cos(2\pi f_{ct})$ is applied to a second multiplier 5.

A horizontal synchronizing signal is applied to A/D converter 6 through a terminal 11. The horizontal synchronizing signal is inputted to adjust a phase of a clock signal to that of a horizontal synchronizing signal. A/D converter 6 samples a voltage of the sine wave signal $\sin(2\pi f_{ct})$ in response to which a horizontal synchronizing signal with a time base fluctuated is obtained and applies the same to an operating device 7 as a digital signal. An initial phase b is set in operating device 7 by an initial phase setting device 8. Operating device 7 contains an ROM for storing sine wave data and an ROM for storing cosine wave data (not shown). Operating device 7 operates a phase difference ($a-b=c$) between an absolute phase a of the digital signal supplied from A/D converter 6 and a phase b set by initial phase setting device 8 to output a sine wave component $\sin(a-b)$ and a cosine wave component $\cos(a-b)$ having the phase difference from the ROM.

The sine wave component $\sin(a-b)$ outputted from operating device 7 is applied to first multiplier 3 and the cosine wave component $\cos(a-t,)$ is applied to multiplier 5. Multiplier 3 multiples the sine wave signal $\sin(2\pi f_{ct})$ by the sine wave component $\sin(a-b)$ which is a first detection signal and outputs the multiplication result as an analog signal. Multiplier 5 multiplies the cosine wave signal $\cos(2\pi f_{ct})$ which is a second reference signal by the cosine wave component $\cos(a-b)$ which is a second detection signal to output the multiplication result as an analog signal. For example, a D/A converter having a four quadrant multiplying function is used as multipliers 3 and 5. The multiplication results outputted from multipliers 3 and 5 are added by an adder 9, which addition is applied to a comparator 12. Comparator 12 binarizes the addition result to be outputted as a writing clock signal W·CK.

Figure 4:
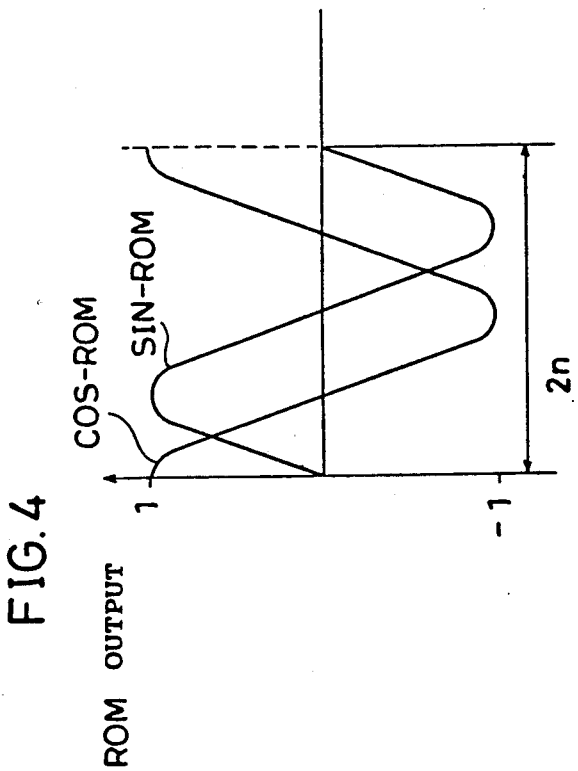
FIG. 4 is a waveform diagram of sine wave data and cosine wave data read from the ROM shown in FIG. 3.

FIG. 4 is the waveform diagram of the sine wave data and the cosine wave data read from the ROM contained in the operating device shown in FIG. 3. As can be seen from FIG. 4, the phase of the sine wave component $\sin(a-b)$ and that of the cosine wave component $\cos(a-b)$ are orthogonal to each other.

Referring to FIGS. 3 and 4, a specific operation of a clock generating apparatus according to one embodiment of the present invention will be described. The reference clock signal of rectangular waveform outputted from crystal oscillator 1 is converted by band pass filter 2 to a sine wave signal $\sin(2\pi f_{ct})$ of 4.05 MHz which is applied to multiplier 3, ¼ cycle delayer 4 and A/D connverter b. ¼ cycle delayer 4 delays the sine wave signal $\sin(2\pi f_{ct})$ by ¼ cycle to generate a cosine wave signal $\cos(2\pi f_{ct})$ which is a second clock signal, and applies the same to multiplier 5. Phase resolutions of the sine wave signal $\sin(2\pi f_{ct})$ and the cosine wave signal $\cos(2\pi f_{ct})$ inputted to multipliers 3 and 5 depend on the bit arrangements of multipliers 3 and 5, respectively. For example, assuming that both multipliers 3 and 5 comprise 5 bits, the phase resolution is 11.25° ($=360°\div32$). The phase resolution is determined based on a residual time base error based on a S/N which an analog circuit of the system has or a correction range of a time base corrector required by the system.

On receiving the horizontal synchronizing signal having the time base fluctuated through terminal 11, A/D converter 6 samples the voltage of the sine wave signal $\sin(2\pi f_{ct})$ to output the sampling result as the digital signal. Operating device 7 receives the digital signal and obtains the absolute phase a of the digital signal to operate a phase difference ($a-b=c$) between the absolute phase and the phase b previously set by initial phase setting device 8. Operating device 7 reads the sine wave component $\sin(a-b)$ and the cosine wave component $\cos(a-b)$ having the phase difference from the built-in ROM. That is, operating device 7 simultaneously accesses the ROM for sine wave and the ROM for cosine wave, using the phases a and b as addresses to simultaneously output the sine wave component and the cosine wave component corresponding to the phase difference ($a-b$) as digital signals. The sine wave component $\sin(a-b)$ outputted from the operating device 7 is applied to multiplier 3 and the cosine wave component $\cos(a-b)$ is applied to multiplier 5. Using as multipliers 3 and 5, the output amplitude thereof can be controlled by a reference signal when converting an input digital signal which is a detection signal to an analog signal.

Therefore, multiplier 3 multiplies the sine wave signal $\sin(2\pi f_{ct})$ which is the first reference signal by the sine wave component $\sin(a-b)$ which is the first detection signal to output the multiplication result $\sin(2\pi f_{ct})\cdot\sin(a-b)$ as an analog signal. Multiplier 5 multiplies the cosine wave signal $\cos(2\pi f_{ct})$ which is the second reference signal by the cosine wave component $\cos(a-b)$ which is the second detection signal to output the multiplication result $\cos(2\pi f_{ct})\cdot\cos(a-b)$ as an analog signal.

The multiplication outputs from multipliers 3 and 5 are added by analog adder 9 and the following output signal is applied to comparator 12.

$$\sin(2\pi f_{ct}) \cdot \sin(c) + \cos(2\pi f_{ct}) \cdot \cos(c) = \cos(2\pi f_{ct} - c) \quad (1)$$

wherein $c = (a - b)$

As is clear from equation (1), the first reference signal is outputted as a cosine wave signal $\cos(2\pi f_{ct} - c)$ with a phase lag of c with respect to the cosine wave signal $\cos(2\pi f_{ct})$ out of phase by 90° from the first reference signal. The cosine wave signal $\cos(2\pi f_{ct} - c)$ is binarized by comparator 12 and outputted as a writing clock signal W·CK. Thus, the writing clock signal W·CK is a clock with a phase synchronized with that of a horizontal synchronizing signal.

As the foregoing, the output cosine wave signal $\cos(2\pi f_{ct} - c)$ includes a phase c corresponding to a phase difference of the horizontal synchronizing signal with respect to one clock of the reference signal. More specifically, the phase of the cosine wave signal $\cos(2\pi f_{ct})$, which phase is the same as that of the sine wave signal, is changed instantly by a phase difference c between the sine wave signal which is the reference signal and the horizontal synchronizing signal which is the input signal. This cosine wave signal $\cos(2\pi f_{ct})$ is phase-locked to the horizontal synchronizing signal having a time base fluctuated. With the cosine wave signal $\cos(2\pi f_{ct})$ converted to a binary signal by comparator 12, a stable writing clock signal W·CK can be obtained.

Figure 1:
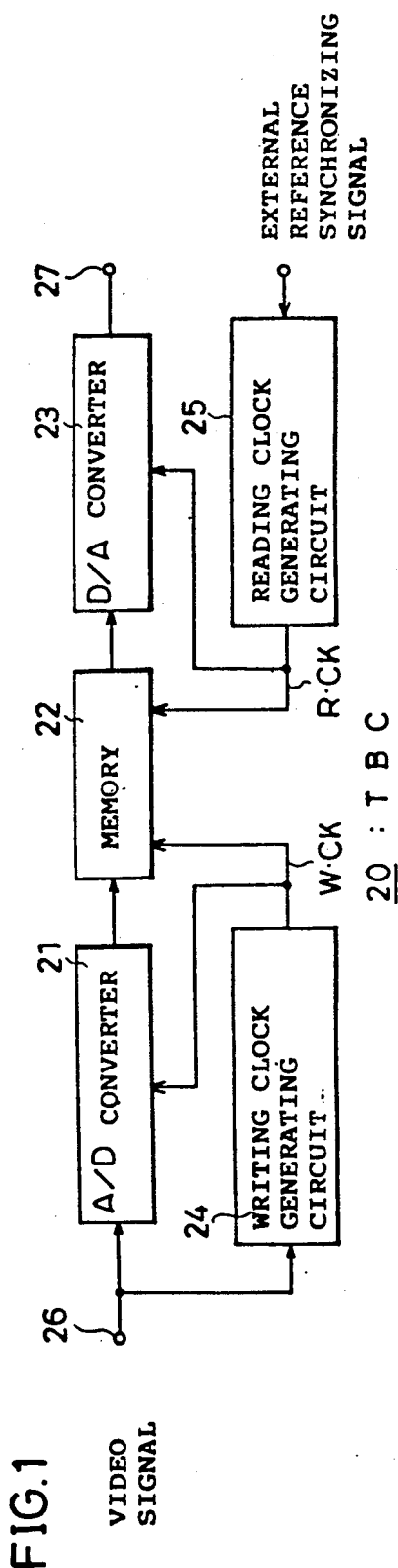
FIG. 1 is a schematic block diagram of a conventional time base corrector.

In the above-described embodiment, a time base correction of a reproduced video signal is carried only by adjusting an initial phase of a writing clock signal W·CK to that of a horizontal synchronizing signal, which achieves a sufficient effect of a time base corrector. This is because a time base fluctuation in one horizontal period is small both for motion picture and still picture in a component recording. When more precise time base corrector effect is required, a phase of a sampling clock (reading clock signal R·CK) of D/A converter 23 for converting a digital signal to an analog signal is phase-modulated in every horizontal period based on a horizontal synchronizing signal and phase error stored in memory 22 shown in FIG. 1. Then, the same means as the above-described writing clock signal generating circuit can be used as a reading clock signal R·CK generating circuit.

Since a sine wave signal and a cosine wave signal are completely the same signals except that they are out of phase by ¼ cycle from each other, completely the same effect can be obtained when exchanging sine wave and cosine wave in the embodiment shown in FIG. 3.

A subtraction may be carried by using an analog subtractor without an addition by analog adder 9.

Figure 6:
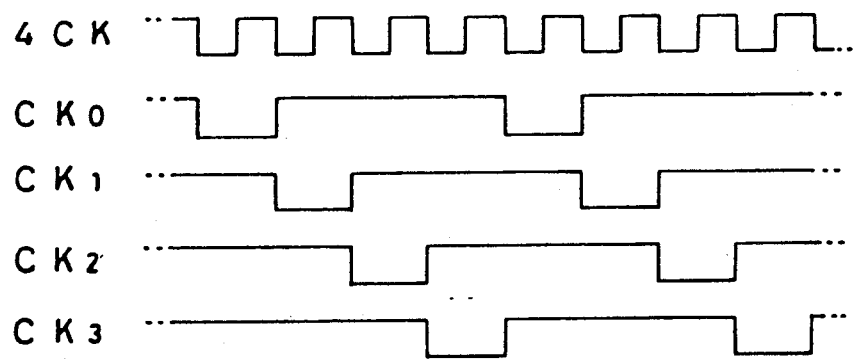
FIG. 6 is a waveform diagram of each reference clock signal outputted from the reference clock generating circuit shown in FIG. 5.

FIG. 5 is the block diagram of another embodiment of the present invention, and FIG. 6 is the timing chart of the reference clock signal generated from the reference clock generating circuit shown in FIG. 5. The embodiment shown in FIG. 5 employs the signals each out of phase by 0, $\pi/2$, $2\pi/2$ and $3\pi/2$ as reference clock signals and digital multipliers 3a and 5a, which embodiment is the same as that shown in FIG. 3 except for the following points.

Reference clock generating circuit 10 includes a crystal oscillator 1a and a 4-bit shift register 51. Crystal oscillator 1a generates a clock signal 4CK corresponding to a sine wave signal $\sin(2\pi f_{ct})$ of a frequency four times 4.05 MHz. The clock signal 4CK is applied to 4-bit shift register 51 wherein the signal is frequency-divided by 4, so that reference clock signals $CK_0$–$CK_3$ of rectangular waveform each having a frequency of 4.05 MHz and each sequentially out of phase by $\pi/2$ from each other as shown in FIG. 6. The reference clock signals $CK_0$–$CK_3$ are applied to digital multiplier 3a, a bit-binarizing circuit 52 and a register 55.

Register 55 delays the respective reference clock signals $CK_0$–$CK_3$ by one clock. The delay amount corresponds to $\pi/2$ in phase, and by applying the reference clock signals $CK_0$–$CK_3$ to register 55, a second clock signal $CK_c$ corresponding to the cosine wave signal $\cos 2\pi f_{ct}$ is outputted from register 55, which signal is applied to digital multiplier 5b. The three reference clock signals $CK_1$–$CK_3$ out of the reference clock signals $CK_0$–$CK_3$ are converted to 2 bits by bit-binarizing circuit 52, which signals are applied to D/A converter 53. D/A converter 53 converts the bit-binarized reference clock signals $CK_1$–$CK_3$ to analog signals in response to the clock signal 4CK. The analog signals are applied to a band pass filter 54 wherein only fundamental wave components of the signals are extracted and applied to A/D converter 6.

Operating device 7 includes a phase exchanger 71 and ROMs 72 and 73. Similarly to the description of the above-described embodiment of FIG. 3, phase exchanger 71 operates a phase difference $a - b = c$ between the absolute phase a of the output of A/D converter 6 and the phase b settled by initial phase setting device 8. ROM 72 stores previously data $\cos(a - b)$ of the cosine wave component and ROM 73 stores previously data $\sin(a - b)$ of the sine wave component. When a phase difference is operated by phase exchanger 71, ROM 72 applies the cosine wave data $\cos(a - b)$ having the phase difference to digital multiplier 5a, thereby applying the sine wave data $\sin(a - b)$ having the phase difference from ROM 73 to digital multiplier 3a.

Digital multiplier 3a multiplies the sine wave clock signals $CK_0$–$CK_3$ as references by the sine wave data $\sin(a - b)$ and digital multiplier 5a multiplies the second clock signal $CK_c$ cosine wave by the cosine wave data $\cos(a - b)$. The multiplication result of digital multiplier 3a is stored in a register 56 in response to the clock signal 4CK and the multiplication result of digital multiplier 5a is stored in a register 57 in response to the clock signal 4CK. The multiplication results respectively stored in registers 56 and 57 are added by a digital adder 9a and the addition result is converted to an analog signal by a D/A converter 58 in response to the clock signal 4CK. The analog signal is applied to a band pass filer 59 wherein only a fundamental wave component of the signal is extracted, which is binarized by comparator 12 and outputted as a writing clock signal W·CK.

Figure 7:
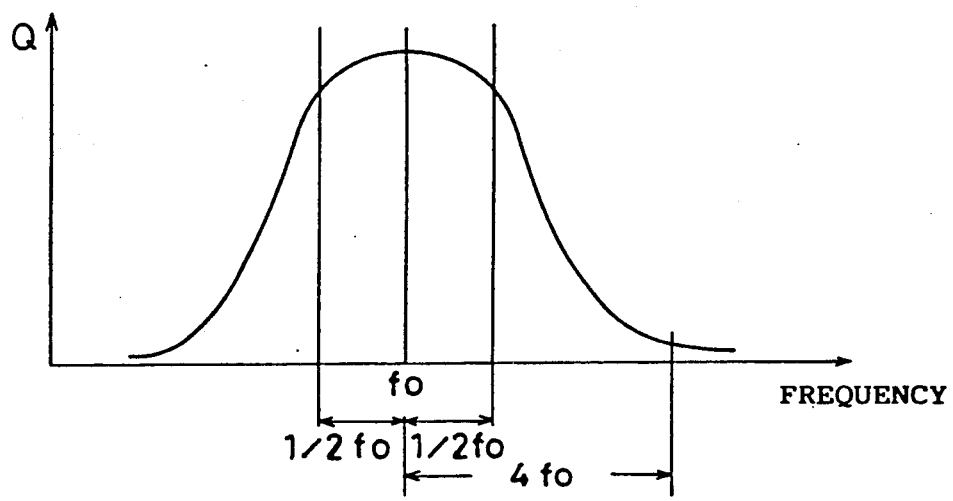
FIG. 7 is a diagram showing a band characteristic of a band pass filter shown in FIG. 5.
Figure 8:
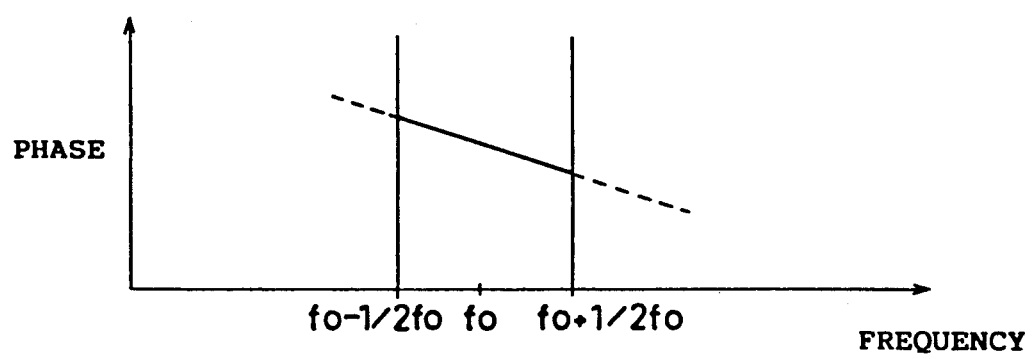
FIG. 8 is a diagram showing a phase characteristic of the same.

FIG. 7 is the diagram showing the band characteristic of the band pass filter shown in FIG. 5 and FIG. 8 is the diagram showing the phase characteristic of the same.

Band pass filter 59 shown in FIG. 5 is desirably selected to have a band characteristic allowing a frequency component in the range of $\pm\frac{1}{2}f_0$ to fully pass and wherein an attenuation amount at $\pm 4f_0$ is more than $1/(2^n - 1)$, centering on a carrier frequency $f_0$. Furthermore, it is desirable that a phase characteristic of band pass filter 59 is selected such that a phase lag characteristic maintains a linear characteristic as shown in FIG. 8 with respect to a frequency in the frequency range of $\pm\frac{1}{2}f_0$, centering on the carrier frequency $f_0$.

Figure 9:
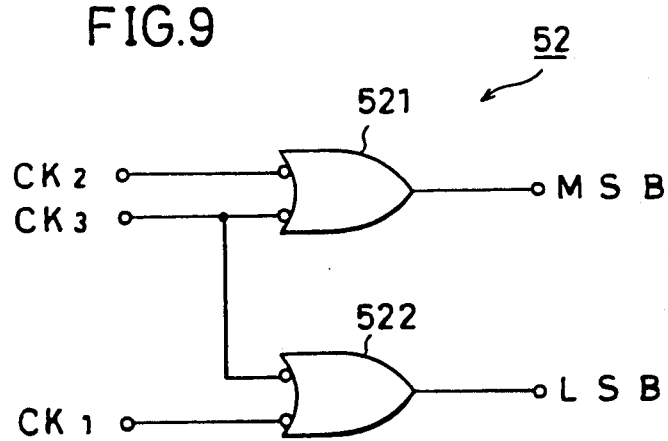
FIG. 9 is a circuit diagram showing one example of bit-binarizing circuit shown in FIG. 5.
Figures 10, 11:
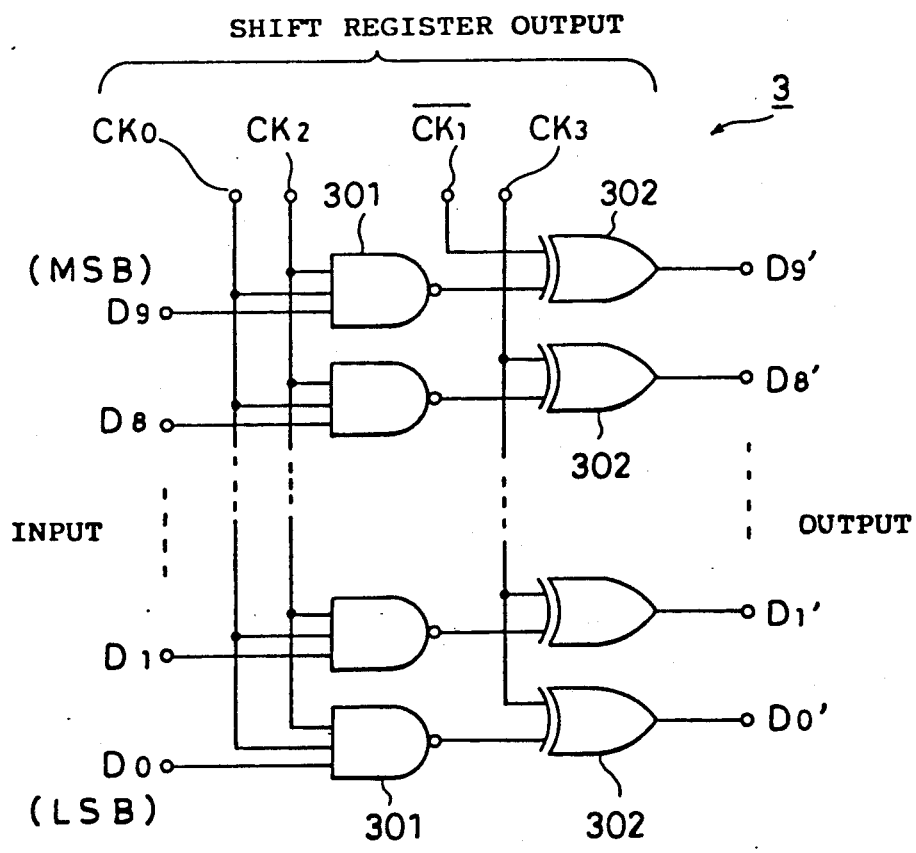
FIG. 10 is a table of truth values of the bit-binarizing circuit shown in FIG. 9.
FIG. 11 is a circuit diagram showing one example of the digital multiplier shown in FIG. 5.

FIG. 9 is the circuit diagram showing one example of the bit-binarizing circuit shown in FIG. 5 and FIG. 10 is the table of truth values of the bit-binarizing circuit shown in FIG. 9.

Referring to FIGS. 9 and 10, a description will be given of the bit-binarizing circuit 52. Bit-binarizing circuit 52 includes OR circuits 521 and 522, OR circuit 521 receiving the reference clock signals $CK_2$ and $CK_3$ and OR circuit 522 receiving the reference clock signals $CK_1$ and $CK_3$. OR circuit 521 outputs MSB bits, while OR circuit 522 outputs LSB bits. The table of truth values of this bit-binarizing circuit 52 is shown in FIG. 10.

FIG. 10 shows 1 relations in each state (0, 1, 0, −1), wherein the 2-bit output is applied to the above-described D/A converter 53 wherein the output is converted to an analog signal.

FIG. 11 is the circuit diagram showing one example of the digital multiplier shown in FIG. 5 and FIG. 12 is the table of truth values of the digital multiplier shown in FIG. 11.

Referring to FIGS. 11 and 12, a description will be made of digital multiplier 3a. Digital multiplier 3a includes 3-input NAND circuit 301 of 10 bits and an EXOR circuit 302. NAND circuit 301 has one input receiving each of bits D0–D9 constituting a sine wave component (a−b) and the other inputs receiving the reference clock signals $CK_0$ and $CK_2$. The output signal of NAND circuit 301 is applied to one input of its corresponding EXOR circuit 302 and the reference clock signal $CK_3$ is applied to each EXOR circuit 302 except for the EXOR circuit 302 of the most significant bit. The most significant bit D9 is a sign bit and therefore the corresponding EXOR circuit 302 receives a clock signal which is the inversion of the reference clock signal $CK_1$.

FIGS. 12A and 12B are tables of truth values of thus constituted digital multiplier 3a. FIG. 12A shows the input/output relation of bits D0–D8, wherein the upper columns indicate the cases where the bits D0–D8 are at a "L" level and the lower columns indicate the cases where they are at a "H" level. In a "0" state, "L" level (this level is considered 0) is output, in a 1 state, the input is outputted without inversion and in a −1 state, the input is inverted to be outputted.

Similarly, FIG. 12B is the table of truth values of bit D9, wherein "L" level denotes minus (−) and "H" level denotes plus (+). With respect to an analog sine wave signal, assuming that the zero point is "0 (=1000000000)", the minimum value is "−512 (=0000000000)" and the maximum value is "+511 (=1111111111)", the multiplication output of the bit D9 is zero in the 0 state, it should be therefore expressed not as (0000000000) but as (1000000000). The multiplier shown in FIG. 11 is accordingly structured to have such logic.

As is clear from FIG. 12B, in the 1 state, the sign bit D9 is outputted without inversion and in the −1 state, it is inverted to be output. Digital multiplier 5a shown in FIG. 5 is similarly structured as that of FIG. 11 and therefore no description will be made thereof.

A specific operation of the embodiment shown in FIG. 5 will be described. Crystal oscillator 1a generates the clock signal 4CK having the frequency quadruple of 4.05 MHz. As shown in FIG. 6, 4-bit shift register 51 frequency-divides the clock signal 4CK to output the reference clock signals $CK_0$–$CK_3$ each having a different phase. Bit-binarizing circuit 52 binarizes the bits of the reference clock signals $CK_1$–$CK_3$ to apply to D/A converter 53 such MSB bits and LSB bits as shown in FIG. 10. D/A converter 53 converts the two-bit digital signals to analog signals, only the fundamental waves of which are extracted by band pass filter 54 to apply analog sine wave signals to A/D converter 6. Similarly to the above-described embodiment shown in FIG. 3, A/D converter 6 samples a voltage of an analog sine wave signal $\sin(2\pi f_{ct})$ when a horizontal synchronizing signal with a time base fluctuated is applied and A/D converter applies the same to operating device 7 as a digital signal. In operating device 7, phase comparator 71 calculates a phase difference between an absolute phase a and a initial phase b of a digital signal to output a sine wave component $\sin(a-b)$ and a cosine wave component $\cos(a-b)$ corresponding to the phase difference $a-b=c$ from ROMs 72 and 73, using the phase difference as an address signal. Digital multiplier 3a multiplies the four reference clock signals $CK_0$–$CK_3$ by the sine wave component $\sin(a-b)$ and digital multiplier 5a multiplies the cosine clock signal $CK_k$ by the cosine wave component $\cos(a-b)$. As a result, digital multiplier 3a outputs the multiplication result of $\sin(2\pi f_{ct}) \cdot \sin(a-b)$, which is stored in register 56, and digital multiplier 5a outputs the multiplication result of $-\cos(2\pi f_{ct}) \cdot \cos(a-b)$, which is stored in register 57. The multiplication results stored in registers 56 and 57 are subtracted by digital adder 9a. That is, digital adder 9a outputs the subtraction result expressed as the following equation (2).

$$\sin(2\pi f_{ct}) \cdot \sin(c) + \cos(2\pi f_{ct}) \cdot \cos(c) = \cos(2\pi f_{ct} - c) \quad (2)$$

where $c = a - b$

As is clear from equation (2), output is the cosine wave signal $\cos(2\pi f_{ct} - c)$ with the phase lag of c with respect to the cosine wave signal $\cos(2\pi f_{ct})$. The cosine wave signal $\cos(2\pi f_{ct} - c)$ is converted to an analog signal by D/A converter 58, the fundamental wave of which signal is extracted by band pass filter 59 to output a writing clock signal W·CK binarized by comparator 12.

Figure 13:
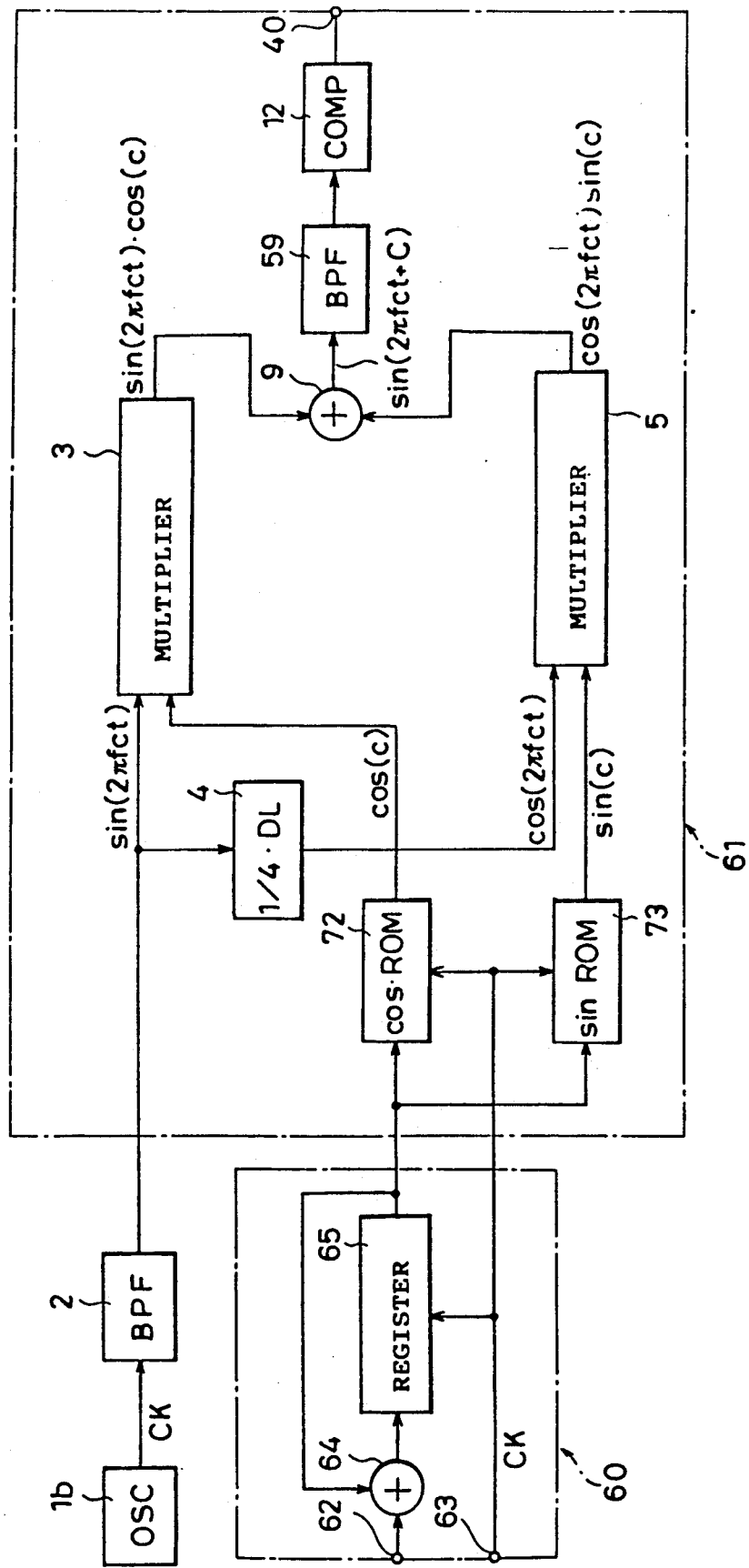
FIG. 13 is a block diagram showing a further embodiment of the present invention.

FIG. 13 is the block diagram showing a still further embodiment of the present invention. The embodiment shown in FIG. 13 is structured to obtain an output clock signal having a desired single frequency in response to an externally applied setting signal. The frequency range of the output clock signal is within the range of a predetermined frequency Δf.

Referring to FIG. 13, the clock generating apparatus comprises an integration circuit 60 and a phase modulating circuit 61. A terminal 62 of integration circuit 60 receives an external setting signal. The setting signal is a 8-bit digital signal which digital value determines a frequency of an output clock signal. The setting signal is applied to an adder 64. Adder 64 adds the set value of the last clock and the present set value. Adder 64 has a 2n bit (n is an integer) arrangement, n is 5 in this embodiment. Therefore, the 8-bit setting signal is supplied to the less significant 8 bits of adder 64 and the remaining 2 bits receive no input. The addition output is again supplied to register 65. By sequentially adding a setting signal of a last clock in this way, an integrated digital setting signal can be obtained from register 65.

Crystal oscillator 1b is for generating a reference clock signal having a frequency of 2.5 MHz, for example, and which reference clock signal CK is applied to a terminal 63 of integration circuit 60 through a band pass filter 2 and also to phase modulating circuit 61. Phase modulating circuit 61 includes multipliers 3 and 5, ¼ cycle delayer 4, adder 9, ROMs 72 and 73, band pass filter 59 and comparator 12. Multipliers 3 and 5, ¼ cycle delayer 4, adder 9 and comparator 12 are the same as those of the embodiment shown in FIG. 3 and ROMs 72 and 73 and band pass filter 59 are the same as those of the embodiment shown in FIG. 5.

The integrated digital setting signal is applied to ROMs 72 and 73, so that ROM 72 outputs a cosine setting signal cos(c) having an amplitude value corresponding to the contents of the bit data of the integrated digital setting signal and which cosine signal is applied to multiplier 3, and a sine digital setting signal sin(c) having the same amplitude value is read from ROM 73 and applied to multiplier 5. Multiplier 3 receives a sine wave reference clock signal $\sin(2\pi f_{ct})$ and multiplier 5 receives a cosine clock signal $\cos(2\pi f_{ct})$ obtained by inverting the sine wave reference clock signal $\sin(2\pi f_{ct})$ by ¼ cycle delaying circuit 4. Multiplier 3 multiplies the sine wave signal $\sin(2\pi f_{ct})$ by the cosine digital setting signal cos(c) read from ROM 72 and the multiplier 5 multiplies the cosine wave signal $\cos(2\pi f_{ct})$ by the sine digital setting signal sin(c). Multipliers 3 and 5 output the multiplication results as analog signals, which signals are applied to adder 9. Adder 9, which is an analog adder, adds the multiplication results of multipliers 3 and 5 and applies the addition to band pass filter 59. Band pass filter 59 extracts only the fundamental wave component from the addition output and applies the same to comparator 12. Comparator 12 binarizes the analog value of the fundamental wave component to output the binarized value from a terminal 40.

FIGS. 14A, 14B, 15A and 15B are frequency spectrum of clock signals generated by the clock generating apparatus shown in FIG. 13.

Referring to FIGS. 13, 14A, 14B, 15A and 15B, an operation of the clock generating apparatus according to the present embodiment will be described. Crystal oscillator 1b, band pass filter 2 and ¼ cycle delayer 4 are the same as those described above of FIG. 3 and therefore no description will be made thereof. When a setting signal is applied to terminal 62 of integration circuit 60, adder 64 adds the set value of a last clock stored in register 65 and the set value of this time, which addition is stored in register 65. Then, register 65 applies the integrated digital setting signal to phase modulator 61.

ROM72 reads a cosine digital setting signal cos(c) having an amplitude value corresponding to the contents of the bit data of the integrated digital setting signal and applies the same to multiplier 3. Similarly, ROM73 reads a sine wave digital setting signal sin(c) having an amplitude value corresponding to the contents of the bit data of the input digital setting signal and applies the same to multiplier 5. Multiplier 3 multiplies the reference clock signal $\sin(2\pi f_{ct})$ by the cosine wave digital setting signal cos(c) to apply the multiplication result $\sin(2\pi f_{ct}) \cdot \cos(c)$ to analog adder 9. Multiplier 5 multiplies the cosine clock signal $\cos(2\pi f_{ct})$ by the sine digital setting signal sin(c) and applies the multiplication result $\cos(2\pi f_{ct}) \cdot \sin(c)$ to analog adder 9. Analog adder 9 adds the two multiplication results and applies the output expressed as the following equation (3) to band pass filter 59.

$$\sin(2\pi f_{ct}) \cdot \cos(c) + \cos(2\pi f_{ct}) \cdot \sin(c) = \sin(2\pi f_{ct} + c) \quad (3)$$

That is, adder 9 outputs the sine reference signal $\sin(2\pi f_{ct}+c)$ leading the sine reference signal $\sin(2\pi f_{ct})$ by c and applies the same to band pass filter 59. Band pass filter 59 limits a band width of the sine wave reference signal $\sin(2\pi f_{ct}+c)$ and applies the band-width limited signal to comparator 12. Comparator 12 binarize the sine wave reference signal $\sin(2\pi f_{ct}+c)$ to output an output clock signal having a frequency corresponding to the setting signal from terminal 40.

As the foregoing, since the phase of the output clock signal obtained at output terminal 40 can be changed corresponding to an input setting signal at a high speed (for $2/f_c$ time period) with respect to a reference signal for every cycle of the reference signal, which results in the phase modulation of the reference signal. As a result, the frequency of the output clock signal is controlled by the input setting signal.

Assuming that both multipliers 3 and 5 comprise 10 bits, the phase resolution is 0.35° ($=360° \div 1023$). The following equation (4) represents a relation between a minimum phase change dc per unit time t and a frequency change df.

$$df = (1/2\pi)(dc/dt) \quad (4)$$

Therefore, the relation between the minimum phase change dc per unit time and a maximum frequency displacement Δf will be expressed as.

$$\Delta f = df(2^8 - 1) \quad (5)$$

Taking into consideration that either for the phase c, positive or negative polarity can be selected every cycle, an oscillating frequency c is expressed as the following equation.

$$f = f_c \pm \Delta f \quad (6)$$

More specifically, it is possible to output a frequency in the range of $\pm \Delta f$, with the reference frequency $f_c$ from crystal oscillator 1b as a center frequency. Therefore, when the following equations are obtained, $$dc = 6.14 \times 10^{-3} \, rad \quad (7)$$

$$dt = 400 \, nsec \, (= 1/f_c = 2.5 \, MHz) \quad (8)$$

it can be expressed as follows:

$$\Delta f = 0.623 \, MHz \quad (9)$$

$$df = 2443 \, Hz \quad (10)$$

so that a frequency in the range of the above-described equation (6) can be obtained at an interval of df. A value of df is determined by the resolutions of multipliers 3 and 5.

From the foregoing description, the clock signal has a frequency in the range of $\pm \Delta f$, with a frequency fc of a reference signal as a center frequency, as shown in FIGS. 14A and 14B. A single frequency such as a, b, c, d . . . can be outputted at an interval of df, with the frequency fc of the reference signal as a reference. The interval of df is determined by the number of bits that multipliers 3 and 5 can employ, wherein when the decreased number of bits results in a long interval of df the increased number results in is a short interval.

A value and polarity of the phase c, that is, the contents of bit data of an input setting signal determine which outputted clock signal of which frequency to be output. If the bit data is small, a clock signal having a frequency close to that of a reference signal and when the bit data is large, a clock signal having a frequency away from the reference signal are selected. When all the bit data of the above-described 8-bit setting signal is "0", then c=0, whereby the reference signal itself is outputted. One example of an output clock signal when the bit data is small is shown by each solid line of FIGS. 14A, 14B, 15A and 15B.

As shown in FIGS. 14A and 15A, when the polarity of the phase c is positive, a signal having a higher frequency than that of a reference signal is outputted as an output clock signal and when the polarity is negative, a signal having a lower frequency than that of the reference signal is outputted as shown in FIGS. 14B and 15B. The polarity of the phase c is changed to positive or negative by reversing for example, the sine wave and cosine wave digital setting signals sin(c) and cos(c) inputted to multipliers 3 and 5.

As is clear from the above-described equations, a completely linear relationship is established between an input voltage of an input setting signal and an output frequency of a reference signal. That is, a linear characteristic is obtained. A frequency range $fc \pm \Delta f$ which can be settled will be expressed as the following equation.

$$fc(1\tfrac{1}{2}) < fc \pm \Delta f < fc(1+\tfrac{1}{2}) \qquad (11)$$

Therefore, an output clock signal having a wide range of frequency can be generated depending on a selected center frequency fc.

As the foregoing, in this embodiment a clock signal CK generated by crystal oscillator 1b has a frequency fluctuated through a digital processing, the frequency fluctuation accordingly depends only on a temperature characteristic, thereby achieving a clock generating apparatus having an excellent temperature characteristic.

Figure 16:
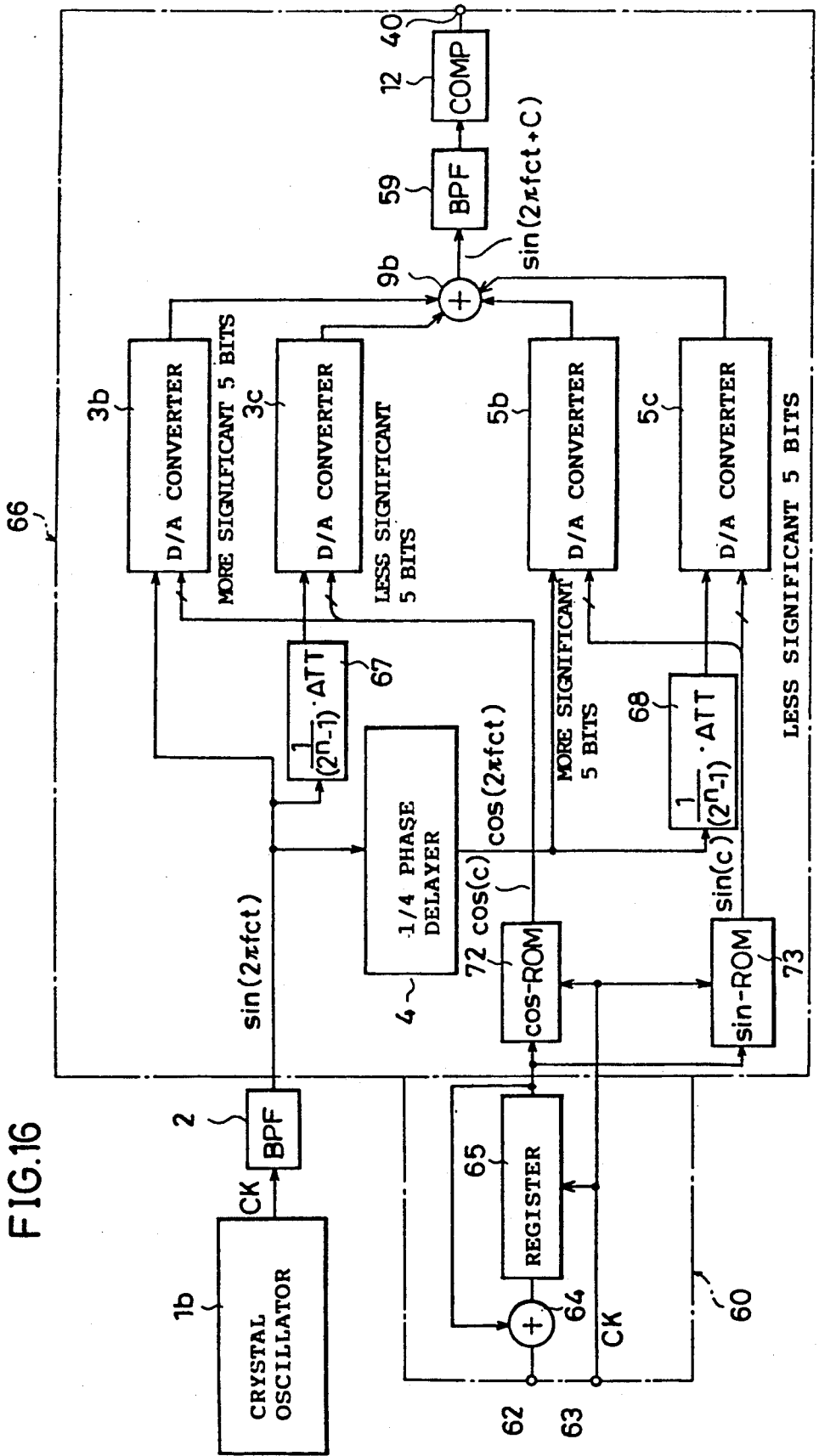
FIG. 16 is a block diagram showing a still further embodiment of the present invention.

FIG. 16 is the block diagram showing a still further embodiment of the present invention. The embodiment shown in FIG. 16 employs low-cost 5-bit multipliers 3b, 3c, 5b and 5c in place of the multipliers 3 and 5 in the above-described embodiment shown in FIG. 13. The sine wave reference clock signal $\sin(2\pi f_{ct})$ is applied to multiplier 3b and an attenuater 67 wherein the input level of the signal is attenuated to $1/(2^n-1)$, which attenuated signal is applied to multiplier 3c. More significant 5 bits of the cosine digital setting signal cos(c) outputted from ROM72 is applied to multiplier 3b and the less significant 5 bits is applied to multiplier 3c. Furthermore, the cosine clock signal $\cos(2\pi f_{ct})$ delayed by $\tfrac{1}{4}$ cycle delayer 4 is applied to an attenuater 68 wherein an input level of the signal is attenuated to $1/(2^n-1)$, which attenuated signal is applied to multiplier 5c. The more significant 5 bits of the sine digital setting signal sin(c) read from ROM 73 is applied to multiplier 5b and the less significant 5 bits is applied to multiplier 5c.

Multiplier 3b multiplies the reference clock signal $\sin(2\pi f_{ct})$ by the more significant 5 bits of the cosine digital setting signal cos(c) and applies the multiplication output to an adder 9b. Multiplier 3c multiplies the attenuated reference clock signal by the less significant five bits of the cosine digital setting signed cos(c) and applies the multiplication result to adder 9b. Similarly, multiplier 5b multiplies the cosine clock signal $\cos(2\pi f_{ct})$ by the most significant five bits of the sine digital setting signal sin(c) and applies the multiplication result to adder 9b. Multiplier 5c multiplies the attenuated cosine clock signal $\cos(2\pi f_{ct})$ by the less significant five bits of the sine digital setting signal sin(c) and applies the multiplication result to adder 9b. Adder 9b adds the input multiplication results and applies the output clock signal $\sin(2\pi f_{ct}+c)$ through band pass filter 59 to comparator 12.

In the embodiment shown in FIG. 16, when the maximum amplitude of the reference clock signal is dissolved by n bit, that is, 5 bits, the amplitude per bit becomes $1/(2^5-1)$ of the maximum amplitude of the reference clock signal. It means therefore that the minimum dissolved amplitude of multiplier 3b is further dissolved by 5 bits by attenuater 67 and multiplier 3c. As a result, a pair of multipliers 3b and 3c and attenuater 67 function as a multiplier of 2n bit. As the foregoing, multipliers 3b, 3c, 5b and 5c each comprising 5-bit arrangement reduce a manufacturing cost.

Since a sine wave signal and a cosine wave signal, for example, are completely the same signals except that they are out of phase by $\tfrac{1}{4}$ cycle, completely the same effect can be obtained even when the sine wave signal and a cosine wave signal are exchanged in the above-described embodiments. Sine waves or cosine waves may be multiplied by each other in multipliers 3b, 3c, 5b and 5c. Furthermore, analog adder 9b can perform not an addition but a subtraction.

Figure 17:
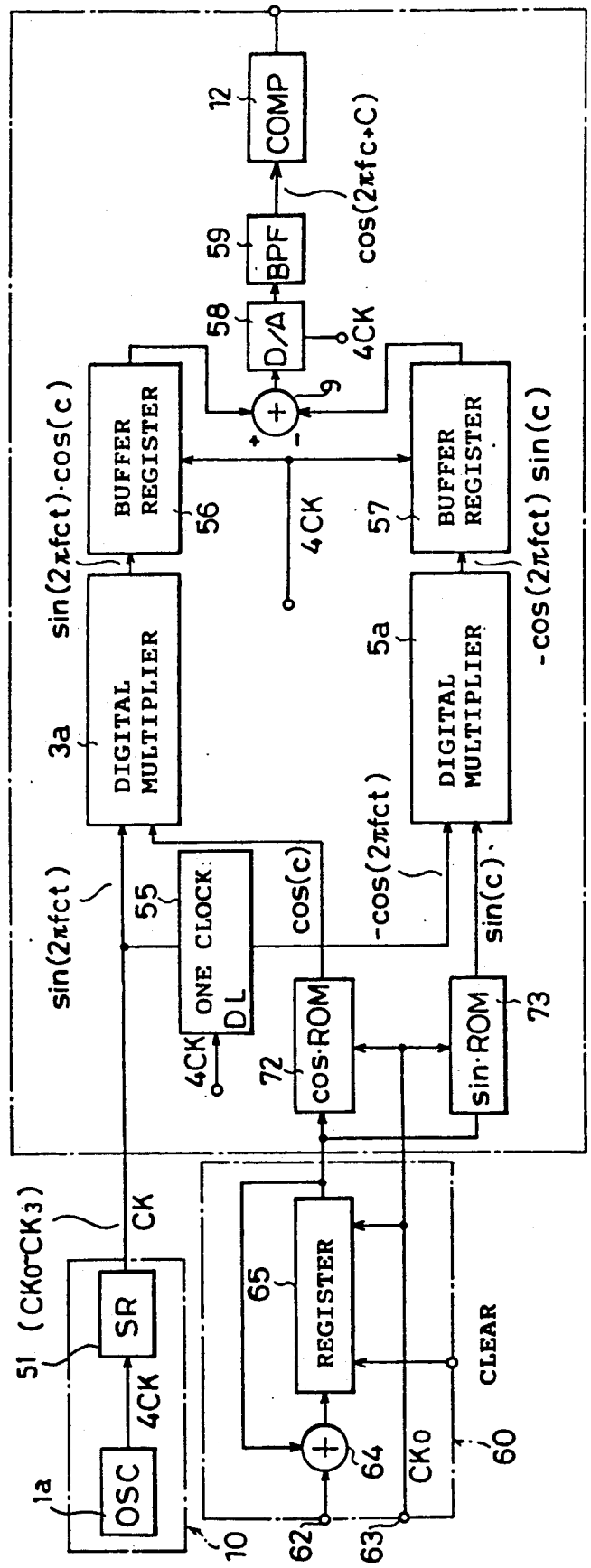
FIG. 17 is a block diagram showing a still further embodiment of the present invention.

FIG. 17 is a block diagram showing a still further embodiment of the present invention. Similar to the above-described embodiment shown in FIG. 5, the present invention employs four reference clock signals $CK_0$–$CK_3$ and integration circuit 60 and ROMs 72 and 73 are similarly structured to those of FIG. 16. Crystal oscillator 1b generates a clock signal 4CK having a frequency of 2.5 MHz $\times$ 4 = 10.0 MHz to generate the four reference clock signals $CK_0$–$CK_3$. The clock signal 4CK is applied to 4-bit shift register 51 to output the reference clock signals $CK_0$–$CK_3$ each out of phase by $\pi/2$ one after another as shown in FIG. 6. Assuming that a reference clock signal having a reference phase is $CK_0$, the four reference clock signals $CK_0$–$CK_3$ out of phase by $\pi/2$, $2\pi/2$, $3\pi/2$, respectively can correspond to a signal repeatedly changing from state 1→state 0→state −1→state 0. Such repeatedly changing signal is a reference signal obtained by analogizing a digital reference clock signal, each state corresponding to each amplitude value, which is a phase of 0, $\pi/2$, $2\pi/2$, $3\pi/2$ of the sine wave signal $\sin(2\pi f_{ct})$ having the same frequency as that of the reference clock signal. The sine wave signal $\sin(2\pi f_{ct})$ can be therefore expressed by the four reference clock signals $CK_0$–$CK_3$ and the amplitude values are 0, 1, 0 and −1, respectively.

The four reference clock signals $CK_0$–$CK_3$ are applied to a one clock delayer 55 comprising a register wherein each signal is delayed by one clock. The delay amount corresponds to $\pi/2$ in phase, whereby a cosine reference clock signal $CK_c(=-\cos(2\pi f_{ct}))$ is outputted one-clock delayer 55. The sine wave reference clock signal $\sin(2\pi f_{ct})$ and the cosine digital setting signal cos(c) outputted from ROM 72 are applied to digital multiplier 3a and the cosine clock signal $-\cos(2\pi f_{ct})$ and the sine digital setting signal sin(c) read from ROM 73 are applied to digital multiplier 5a. The following operation is the same as that of FIG. 5 and therefore no description will be made thereof.

Figure 18:
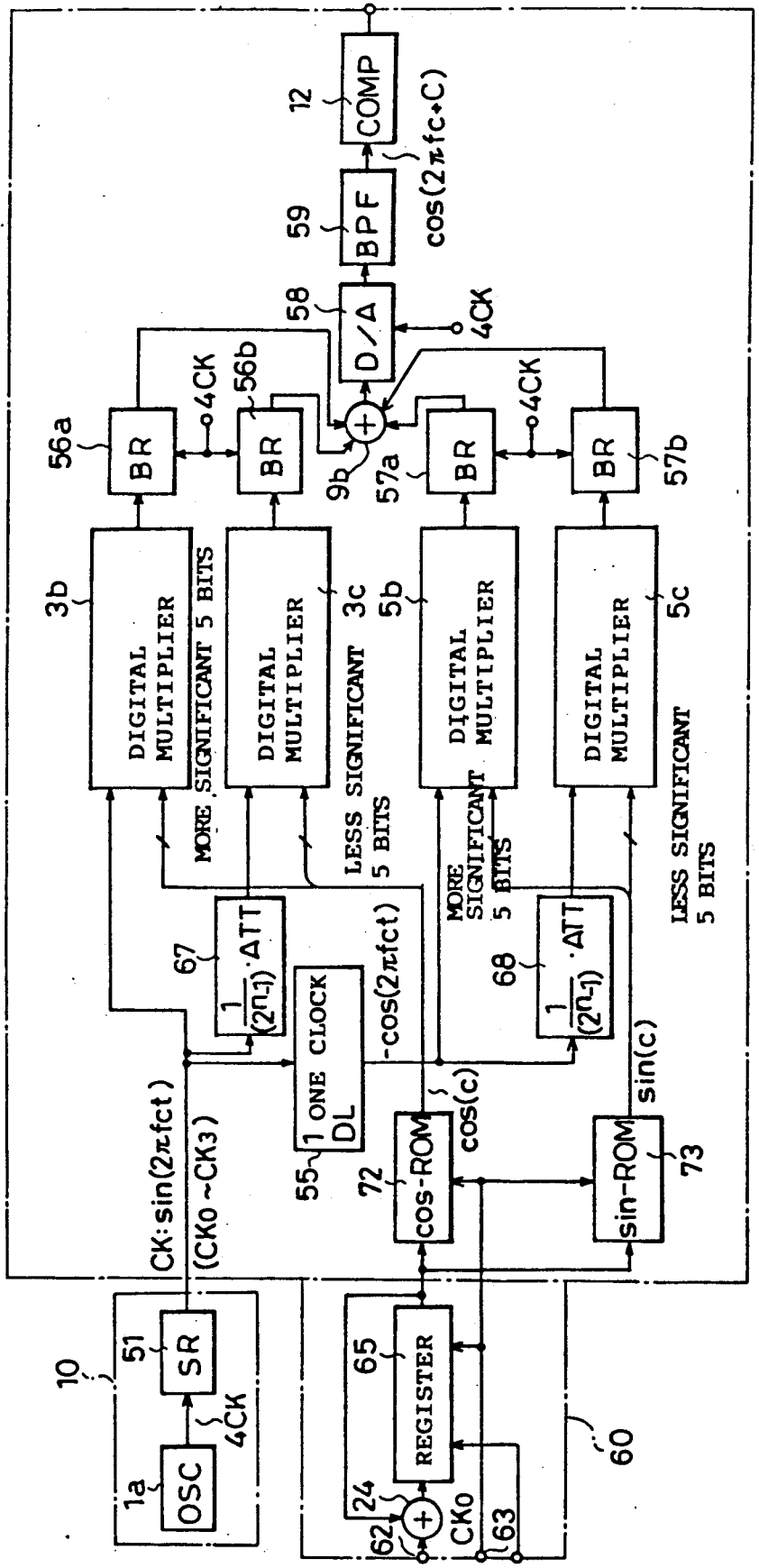
FIG. 18 is a block diagram showing a still further embodiment of the present invention.

FIG. 18 is the block diagram showing a still further embodiment of the present invention. Similar to the above-described embodiment shown in FIG. 16, the present embodiment employs low cost 5-bit digital multipliers 3b, 3c, 5b and 5c in place of the digital multipliers 3a and 5a of the embodiment shown in FIG. 17. The input level of the sine wave reference clock signal $\sin(2\pi f_{ct})$ is attenutated to $1/(2^n-1)$ by attenuater 67 and the attenuated signal is applied to digital multiplier 3c. Digital multiplier 3c receives the less significant 5 bits of the cosine digital setting signal cos(c) read from ROM 72 and digital multiplier 3b receives the more significant 5 bits. Attenuater 68 attenuates the input level of the cosine clock signal $-\cos(2\pi f_{ct})$ delayed by one clock by a one clock delayer 55 to $1/(2^n-1)$, which is applied to digital multiplier 5c. The less significant 5 bits of the sine digital setting signal sin(c) read from ROM 73 is applied to digital multiplier 5c and more significant 5 bits is applied to digital multiplier 5b. The multiplication results of the respective digital multipliers 3b, 3c, 5b and 5c are stored in registers 56a, 56b, 57a and 57b, which results are added by adder 9b. The other operations are the same as those of the embodiment shown in FIG. 17.

While in the above-described embodiment, sine and cosine digital setting signals are obtained by ROMs 72 and 73, the signals can be generated by using either one of the ROMs because a sine signal and a cosine signal have an orthogonal phase to each other.

In addition, since a sine wave signal and a cosine wave signal are completely the same signals except that they are out of phase by ¼ cycle, the same result can be obtained by changing the sine wave signal to/from the cosine wave signal in each embodiment described above.

Sine waves or cosine waves may be multiplied by each other in digital multipliers 3b, 3c, 5b and 5c. Not a subtraction but an addition may be carried out by adder 9b.

APPLICABLE FIELD IN THE INDUSTRY

The clock generating apparatus according to the present invention can be used as a time base corrector for removing a time base fluctuation of a video signal produced from an optical disc or a video tape recorder and it can be applied to such a clock generating apparatus as generating a writing clock signal corresponding to a time base fluctuation of a video signal.

We claim:

1. A clock generating apparatus for generating an output clock signal by synchronizing a phase of an input signal with a phase of a reference clock signal, comprising:
   first clock signal generating means for generating the reference signal as a first clock signal;
   second clock signal generating means, responsive to said first clock signal, for generating a second clock signal having a phase orthogonal to a phase of said first clock signal;
   phase difference detecting means for detecting a phase difference between said input signal and said first clock signal and for outputting first and second detection signals having phases which are orthogonal to each other and each signal representing the detected phase difference; and
   output clock signal generating means, responsive to said first clock signal, said second clock signal, and said first and second detection signals, for generating an output clock signal synchronized with a phase of said input signal.

2. A clock generating apparatus for generating an output clock signal by synchronizing a phase of an input signal with a phase of a reference clock signal, comprising:
   first clock signal generating means for generating the reference signal as a first clock signal;
   second clock signal generating means, responsive to said first clock signal, for generating a second clock signal having a phase orthogonal to a phase of said first clock signal;
   phase difference detecting means for detecting a phase difference between said input signal and said first clock signal and for outputting first and second detection signals having phases which are orthogonal to each other and each signal representing the detected phase difference; and
   output clock signal generating means, responsive to said first clock signal, said second clock signal, and said first and second detection signals, for generating an output clock signal synchronized with a phase of said input signal;
   said phase difference detecting means including,
     sampling means for sampling said input signal in response to said first clock signal,
     operating means for determining a phase difference between an absolute phase of the sampled input signal and a predetermined phase, and
     storing means, operatively connected to said operating means for storing predetermined sine wave data and cosine wave data, for outputting a sine wave signal having the detected phase difference as said first detection signal, and for outputting a cosine wave signal having the detected phase difference as said second detection signal.

3. The clock signal generating apparatus according to claim 2, further comprising phase setting means for setting said predetermined phase in said operating means.

4. The clock signal generating apparatus according to claim 1, wherein said second clock signal generating means comprises delaying means for delaying a phase of said first clock signal by a predetermined cycle and for outputting the delayed clock signal as said second clock signal.

5. The clock signal generating apparatus according to claim 1, wherein said output clock signal generating means comprises:
   first multiplying means for multiplying said first clock signal by said first detection signal;
   second multiplying means for multiplying said second clock signal by said second detection signal; and
   adding means for adding respective outputs of said first and second multiplying means and for outputting the sum as said output clock signal.

6. The clock signal generating apparatus according to claim 1, wherein said first clock signal generating means comprises:
   clock signal generating means for generating a clock signal having a frequency 4 times a frequency of said first clock signal; and
   frequency-dividing means for frequency-dividing the clock signal generated from said clock signal generating means using a frequency-division ratio of ¼, thereby outputting a plurality of clock signals, each having a different phase, as a plurality of first clock signals;

said second clock signal generating means including delaying means for delaying said plurality of first clock signals each having a different phase by one clock, thereby outputting the delayed plurality of first clock signals as a plurality of second clock signals.

7. The clock generating apparatus according to claim 6, wherein said output clock signal generating means comprises:

first multiplying means for multiplying said plurality of first clock signals by said first detection signal;

second multiplying means for multiplying aid plurality of second clock signals by said second detection signal; and adding means for adding output signals of said first and second multiplying means;

said output clock signal generating means including a bandpass filter to filter the sum from said adding means and outputting the filtered signal as said output clock signal.

8. A clock signal generating apparatus for generating a clock signal having an arbitrary frequency in a predetermined frequency range in response to a reference clock signal, comprising:

first clock signal generating means for generating the reference clock signal as a first clock signal;

second clock signal generating means, responsive to said first clock signal, for generating a second clock signal having a phase orthogonal to a phase of said first clock signal;

an input terminal which receives a setting signal for setting the predetermined frequency;

integrating means, responsive to said first clock signal, for integrating said setting signal supplied to said input terminal;

storing means for storing predetermined sine wave data and cosine wave data and for reading sine wave data and cosine wave data, each having an amplitude value corresponding to the integrated setting signal in response to the integrated setting signal; and output clock signal generating means, responsive to said first clock signal, said second clock signal and the sine wave data and the cosine wave data read from said storing means, for generating an output clock signal having a phase synchronized with the reference clock signal and a frequency set by said setting signal.

9. A clock signal generating apparatus for generating a clock signal having an arbitrary frequency in a predetermined frequency range in response to a reference clock signal, comprising:

first clock signal generating means for generating the reference clock signal as a first clock signal;

second clock signal generating means, responsive to said first clock signal, for generating a second clock signal having a phase orthogonal to a phase of said first clock signal;

an input terminal which receives a setting signal for setting the predetermined frequency;

integrating means, responsive to said first clock signal, for integrating said setting signal supplied to said input terminal;

storing means for storing predetermined sine wave data and cosine wave data and for reading sine wave data and cosine wave data, each having an amplitude value corresponding to the integrated setting signal in response to the integrated setting signal; and output clock signal generating means, responsive to said first clock signal, said second clock signal, and the sine wave data and the cosine wave data read from said storing means, for generating an output clock signal having a phase synchronized with the reference clock signal and a frequency set by said setting signal;

said output clock signal generating means including, first multiplying means for multiplying said first clock signal by the cosine wave data read from said storing means, second multiplying means for multiplying said second clock signal by the sine wave data read from said storing means, and adding means for adding respective outputs of said first and second multiplying means;

said output clock signal generating means including a bandpass filter to filter the sum from said adding means and outputting the filtered signal as said output clock signal.

10. The clock signal generating apparatus according to claim 9, wherein said storing means comprises:

means for storing the sine wave data and cosine wave data separately and for outputting the sine wave and cosine wave data as a plurality of more significant bits and a plurality of less significant bits;

first attenuating means for attenuating an amplitude of said first clock signal to a predetermined level; and second attenuating means for attenuating an amplitude of said second clock signal to a predetermined level;

said first multiplying means including, third multiplying means for multiplying said first clock signal by the plurality of more significant bits of the cosine wave data read from said storing means, and fourth multiplying means for multiplying said first clock signal having the amplitude attenuated to the predetermined level by the plurality of less significant bits of the cosine wave data read from said storing means; said second multiplying means including, fifth multiplying means for multiplying said second clock signal by the plurality of more significant bits of the sine wave data read from said storing means, and sixth multiplying means for multiplying said second clock signal having the amplitude attenuated to the predetermined level by the plurality of less significant bits of the sine wave data read from said storing means.

11. The clock signal generating apparatus according to claim 8, wherein said first clock signal generating means comprises:

clock signal generating means for generating a clock signal having a frequency 4 times a frequency of said first clock signal; and frequency-dividing means for frequency-dividing said clock signal generated from said clock signal generating means using a frequency-division ratio of ¼ and for outputting a plurality of clock signals, each having a different phase, as a plurality of first clock signals;

said second clock signal generating means including delaying means for delaying the plurality of first clock signals and for outputting the delayed first clock signals as a plurality of second clock signals.

12. The clock signal generating apparatus according to claim 11, wherein said output clock signal generating means comprises:

first multiplying means for multiplying said plurality of first clock signals by said first detection signal;

second multiplying means for multiplying said plurality of second clock signals by said second detection signal; and adding means for adding the results of said first and second multiplying means;

said output clock signal generating means including a bandpass filter to filter the sum from said adding means and outputting the filtered signal as said output clock signal.

13. The clock signal generating apparatus according to claim 8, wherein said integrating means comprises:

temporary storing means for temporarily storing said setting signal supplied to said input terminal in response to said first clock signal and for outputting the temporarily stored setting signal to said storing means; and adding means for adding an output of said temporary storing means and said setting signal every time said setting signal is applied to said input terminal to produce a sum;

said temporary storing means temporarily storing said sum.

* * * * *